United States Patent [19]

Doychak et al.

[11] Patent Number: 5,250,764
[45] Date of Patent: Oct. 5, 1993

[54] CONSECUTIVE PLATE ACOUSTIC SUPPRESSOR APPARATUS AND METHODS

[75] Inventors: Joseph Doychak, Westlake, Ohio; Tony L. Parrott, Williamsburg, Va.

[73] Assignee: The United States of America as represented by the Administrator of the National Aeroneutics & Space Administration, Washington, D.C.

[21] Appl. No.: 961,943

[22] Filed: Oct. 16, 1992

[51] Int. Cl.⁵ .............................................. E04F 17/04
[52] U.S. Cl. .................................. 181/224; 181/286; 181/294; 181/296
[58] Field of Search ............... 181/210, 211, 213, 217, 181/218, 219, 224, 258, 264, 270, 286, 292, 293, 294, 295, 296

[56] References Cited

U.S. PATENT DOCUMENTS

| | | | |
|---|---|---|---|
| 959,400 | 5/1910 | Stinson | 181/223 |
| 3,113,634 | 12/1963 | Watters | 181/224 |
| 3,511,337 | 5/1970 | Pease et al. | 181/224 |
| 3,667,570 | 6/1972 | WerBell, III | 181/223 |
| 3,734,234 | 5/1973 | Wirt | 181/292 |
| 3,895,680 | 7/1975 | Savkar et al. | 181/224 |
| 4,141,433 | 2/1979 | Warnaka | 181/286 |
| 4,316,522 | 2/1982 | Hirschorn | 181/224 |
| 4,410,065 | 10/1983 | Harvey | 181/224 |
| 4,848,514 | 7/1989 | Snyder | 181/290 |
| 4,926,963 | 5/1990 | Snyder | 181/290 |
| 4,947,958 | 8/1990 | Snyder | 181/296 |
| 4,997,705 | 5/1991 | Caprette, Jr. et al. | 181/294 X |
| 5,014,815 | 5/1991 | Arcas et al. | 181/213 |

OTHER PUBLICATIONS

"The Design of Sound Absorptive Materials to Meet Special Requirements", by L. S. Wirt, Presented at the 86th Meeting Accoustical Society of America, Los Angeles, California, Oct. 31, 1973.

*Primary Examiner*—Michael L. Gellner
*Assistant Examiner*—Khanh Dang
*Attorney, Agent, or Firm*—Gene E. Shook; Guy M. Miller; James A. Mackin

[57] ABSTRACT

An apparatus and method for suppressing acoustic noise utilizes consecutive plates, closely spaced to each other so as to exploit dissipation associated with sound propagation in narrow channels to optimize the acoustic resistance at a liner surface. The closely spaced plates can be utilized as high temperature structural materials for jet engines by constructing the plates from composite materials. Geometries of the plates, such as plate depth, shape, thickness, inter-plate spacing, arrangement, etc., can be selected to achieve bulk material-like behavior.

25 Claims, 8 Drawing Sheets

CONSECUTIVE PLATE ACOUSTIC SUPPRESSOR APPARATUS AND METHODS

ORIGIN OF THE INVENTION

The invention described herein was made by employees of the U.S. Government and may be manufactured and used by or for the U.S. Government without the payment of any royalties thereon or therefor.

FIELD OF THE INVENTION

This invention relates to sound attenuation apparatus and methods, and in preferred embodiments to apparatus and methods for sound attenuation especially suitable for duct liners in high temperature flow ducts such as, for example, jet aircraft engines and turbines.

BACKGROUND

Federal regulations limit the level or amount of noise that may be emitted from a jet engine. Thus, various methods and designs have been proposed for attenuating noise in flow ducts of aircraft engines. One such design uses an acoustic lining system. This system relies on the open architectures of acoustic suppression materials to act as Helmholtz resonators. The acoustic liner includes a sound permeable facing sheet and a sound impermeable backing sheet sandwiched around a honeycomb core. The facing sheet is generally formed from sintered metal mesh and is attached to a perforated liner. The perforations are sized and spaced such that the liner is tuned to the noise frequency generated at different locations in the engine. The honeycomb core dissipates acoustical energy after passing through the metal mesh and tuned liner. The sound impermeable backing resists acoustical energy radiation, thereby preventing sound transmission.

The laminar sound attenuator described above suffers from several drawbacks. The sound frequency in the jet engine duct varies throughout the duct. Thus, the liner must be precisely tuned to the varying frequencies to take advantage of the Helmholtz resonator effect. As a result, the attenuation level drops severely if frequencies change or if the liner is not precisely tuned. Many factors, including engine model and fan speed, affect the discrete primary frequencies which cause the noise in jet engines. Consequently, it is difficult to design a precisely tuned liner without incurring unreasonable expense and risk of an inoperative or ineffective liner. Other drawbacks include high speed grazing flow effects and degradation due to high temperatures.

Recent designs have attempted to broaden the frequency range over which these noise attenuators effectively attenuate sound waves. One such design provides plural layers of permeable sheets and honeycomb cores. Although this design achieves a broader sound attenuating characteristic, the liners are bulky and heavy and difficult to manufacture for effective use in jet engines. Another design involves modifying the shape and design of the honeycomb structure. The resulting complex honeycombs are difficult and expensive to manufacture.

U.S. Pat. No. 3,734,234 to Wirt discloses a sound absorbing structure having a honeycomb like cellular layer, an impermeable backing sheet, a permeable facing sheet, and oblique porous partition members having a specified flow resistance in each cell. FIGS. 10 and 16 show oblique partition members disposed between parallel walls. These members act in a similar manner as if a bulk material were disposed between the parallel walls. The parallel walls are not spaced apart from one another so as to function as noise attenuators, but instead merely act as wave guides, with the oblique members functioning as noise attenuators.

Another design for attenuating sound over a broader frequency band is disclosed in U.S. Pat. No. 5,014,815 to Arcas et al. The acoustic liner disclosed therein comprises a sound permeable inside plate forming a first closed annulus and a second impermeable outside plate forming a second closed annulus. The inside and outside plates are spaced apart and thus form an annulus chamber therebetween in which a core member is secured. The core member has a sinusoidal shape and extends annularly around the inside plate. The resulting variable depth sound absorption chambers attenuate sound waves over a substantially broader frequency range.

U.S. Pat. Nos. 4,848,514, 4,926,963 and 4,947,958 to Snyder disclose sound attenuating laminates consisting of several layers, each of which assists in suppressing noise. Hollow rivets are used for installation purposes and conduct acoustical energy to the intermediary layers of the noise attenuating laminate. The above-described patents all suffer from the same drawbacks that result from the layer type structure such as difficulty in precisely tuning the liner and expense and intricacy of manufacture.

Another type of sound attenuator is disclosed in a design for a gun baffler or silencer. These devices have deflecting members which dissipate sound by slowing or diverting expanding gasses. In a high temperature, high speed flow duct, such as an aircraft engine, such an attenuator would severely hamper the efficiency and flow through the duct, thereby rendering the device inoperable.

It is also known that bulk type materials, such as fiberglass or foams, installed in resonator cavities, enhance broadband noise attenuation. Bulk material, however, is structurally unacceptable in most aircraft applications due to its size and its inability to withstand high temperatures.

SUMMARY OF THE INVENTION

Accordingly, it is an object of the present invention to provide apparatus and methods for suppressing acoustic noise which overcome the above-described problems in the prior art.

It is another object of the present invention to provide apparatus and methods for suppressing acoustic noise, particularly useful in jet engines, in which the noise dissipation effect is easily altered to optimize suppression over a broad frequency range.

It is a further object of the present invention to provide apparatus and methods for suppressing acoustic noise which can make use of brittle materials capable of withstanding high temperatures and environmental attack.

The present invention accomplishes these and other objects, and overcomes shortcomings set forth above by utilizing consecutive parallel plates to suppress acoustic noise. The plates are arranged so that they extend away from (e.g. substantially perpendicular to) the direction of flow through the flow duct, and are closely spaced to one another relative to a diameter of the flow duct. The plates exploit dissipation associated with sound propagation in narrow channels as a means of optimizing the acoustic resistance at a liner surface without substantially reducing the rate of flow through the flow duct.

The apparatus and method utilize closely spaced plates of materials having specific geometries to achieve bulk material-like behavior. The geometries of the plates, such as shape, thickness, depth, inter-plate spacing, arrangement, etc., can be varied easily depending on the frequency range of the noise at specific locations in the flow duct, so as to optimize noise suppression over a broad range of frequencies which may exist through the flow duct.

The plates can be flat, curved, or angled with respect to both the liner surface plane and its normal. The plates can be smooth or can have surface texture such as, for example, ribs or other protuberances. The plates can be dense or porous, composite or monolithic, and can be made of any material suitable for the application to which they are applied. The plates can have variable thicknesses and depths. The plates can be joined or integrally fabricated by any means suitable for the appropriate material, such that the specified geometry of the liner can be maintained during use.

The present invention has a number of advantages including:

1) The dissipative process, and thereby the impedance of the liner, can be controlled by plate spacing, plate thickness, and orientation with respect to the incident sound and flow in the flow duct so as to optimize noise suppression and aerodynamic efficiency.

2) The liners can be readily fabricated from any materials. Techniques such as brazing, diffusion bonding, fasteners, etc., can all be used to join the plates providing the spacings between plates can be maintained. Appropriate structural members can be incorporated as required. The present invention is especially conducive to the use of brittle materials in that brittle materials are often most easily fabricated in plate form.

3) The present invention allows for the use of thick-walled materials which are more resistant to thermal oxidation than thin-walled materials. Thick-walled plates also offer the ability to use reinforcing fibers for structural integrity.

BRIEF DESCRIPTION OF THE DRAWINGS

Other objects and advantages will become apparent when considered in light of the following detailed description of preferred embodiments taken in conjunction with the accompanying drawings, in which.

DETAILED DESCRIPTION OF PREFERRED EMBODIMENTS

The invention will be described in connection with noise attenuation in jet aircraft engines; however, the invention is not limited to such an application and those skilled in the art will certainly contemplate other useful applications.

Figure 1:
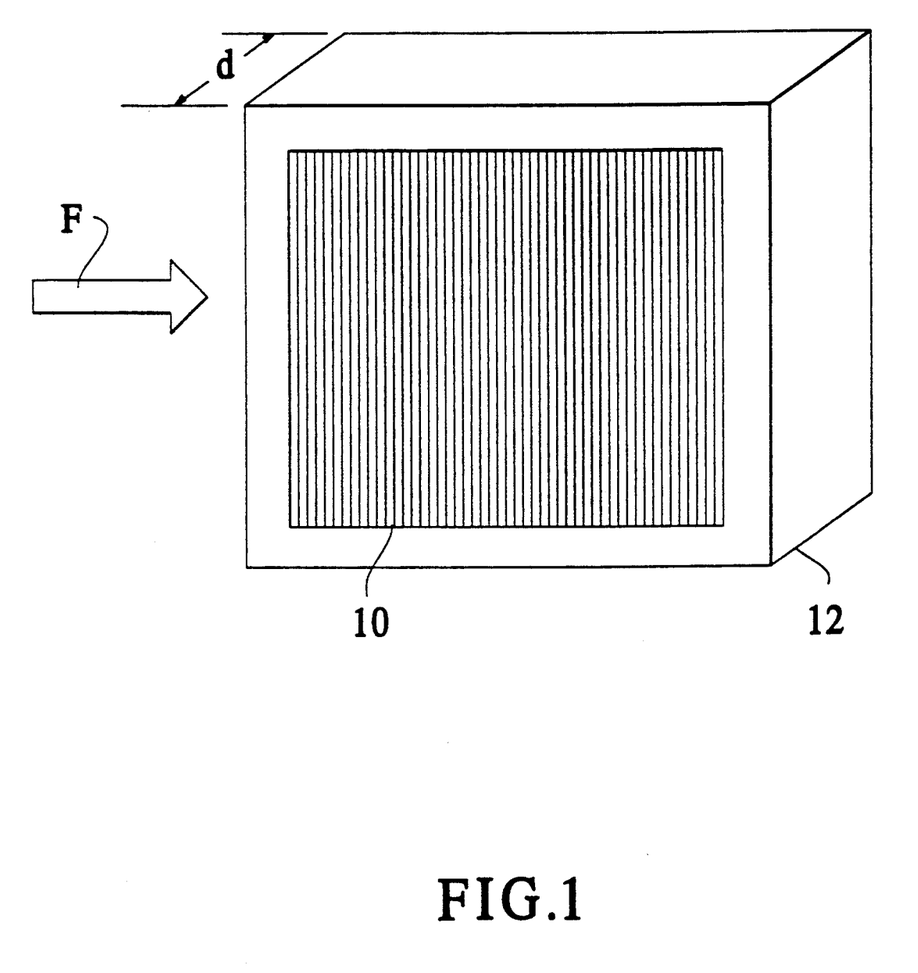
FIG. 1 is a front perspective view of one parallel plate specimen of the present invention.
Figure 12:
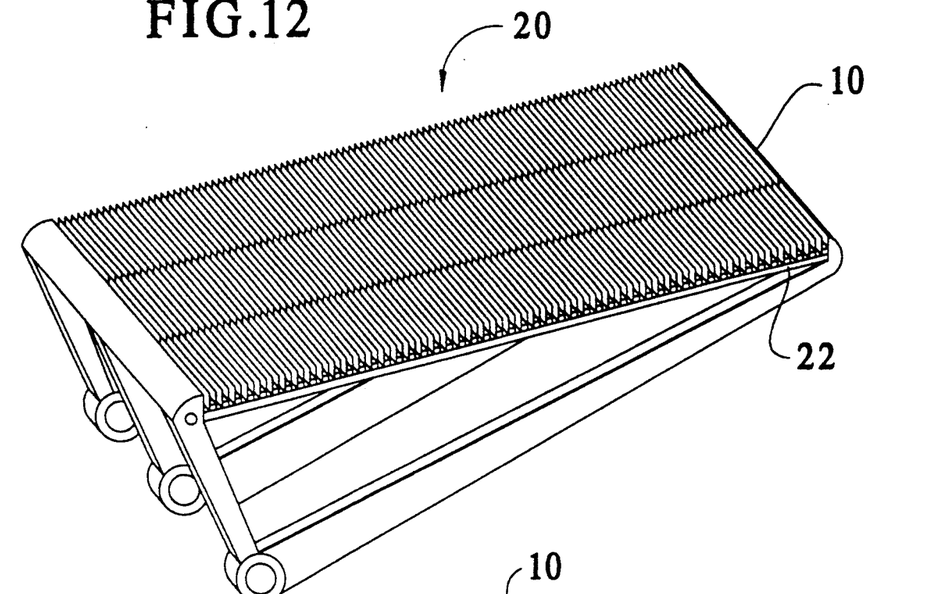
FIG. 12 is a perspective view of the plate structure incorporated in an exhaust nozzle flap.

Referring to FIGS. 1 and 12, a plurality of parallel plates 10 are arranged within a flow duct and are closely spaced relative to the diameter of the flow duct. FIG. 1 shows a test specimen representing a portion of a duct wall. FIG. 12 shows the plate structure in an exhaust nozzle flap 20. The edge surfaces of the plates constitute the duct wall or liner surface. The direction of flow through the flow duct is represented by arrow F.

The close spacing of the plates of the present invention enables the exploitation of dissipation associated with sound propagation in narrow channels as a means of optimizing acoustic resistance at the liner surface. The inter-plate spacing should be no larger than the shear wavelength in the acoustic boundary layer. Effects on flow through the duct induced by the closely spaced plates has not yet been substantiated, although the rate of flow will not be substantially reduced. Essentially, the closely spaced parallel plates function as a resonant device with the resonance frequency, at which maximum absorption occurs, controlled by the plate geometry, such as, for example, channel depth, spacing, etc. The acoustic absorption is provided by viscous dissipation of acoustic energy between the closely spaced plates. The dissipation is controlled by the internal surface area of, and clearance between the plates. In order to function as an acoustic suppressor, the plates must be spaced from one another by an amount greater than 0 and less than about 0.25", and preferably in the range between 0.005" and 0.025".

The plates can be made from any fiber reinforced composite able to withstand high temperatures of at least 1300° C. (when used in a high temperature environment) and are preferably made from a ceramic matrix composite material. The plates can be dense or porous, composite or monolithic. The consecutive parallel plate arrangement allows for use of thick-walled materials which are more resistant to thermal oxidation than thin-walled materials. Thick walled plates also offer the ability to use reinforcing fibers for structural integrity.

Figure 2:
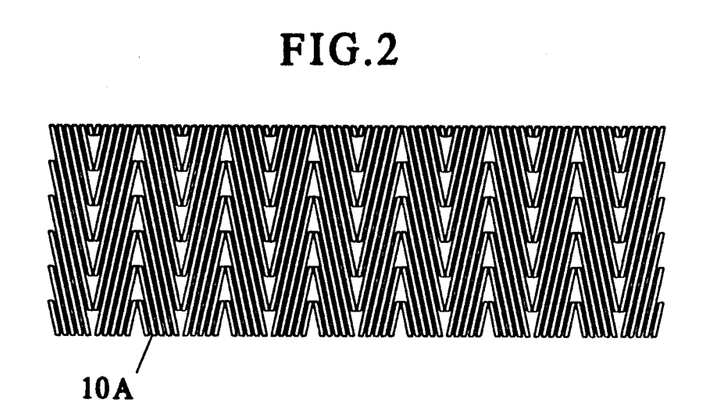
FIGS. 2-5 are front views showing variations of the shape of the closely spaced consecutive plates.
Figure 3:
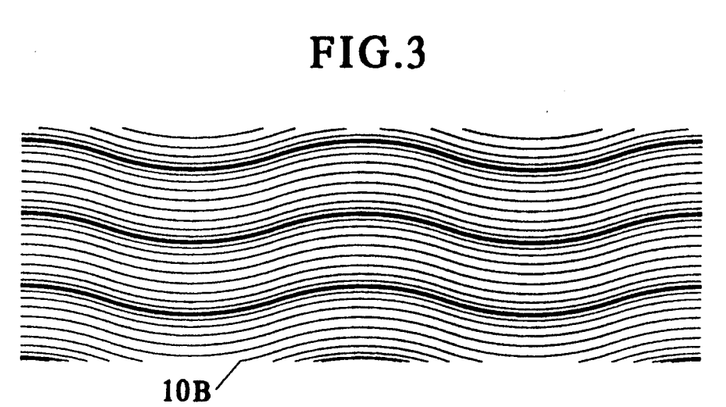
Figure 4:
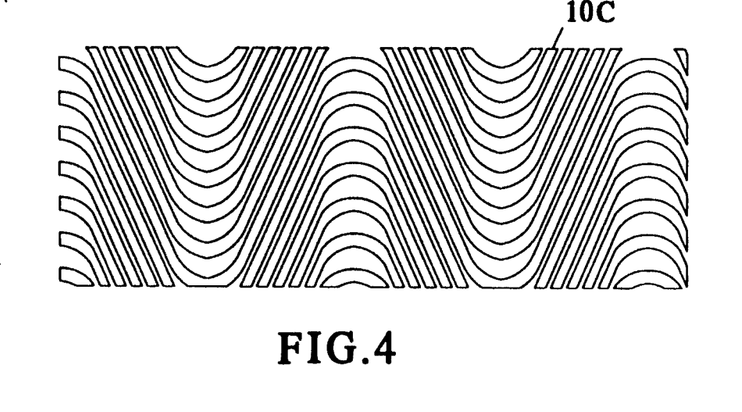
Figure 5:
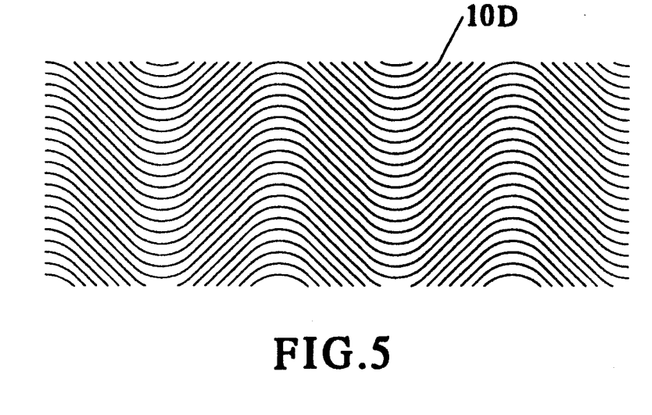

Variations in noise frequency within the flow ducts can be accommodated by changing the geometry of the plates 10. In an aircraft engine, for example, the noise frequencies vary substantially throughout the flow duct. To achieve optimum results, the plate geometries can be "tuned" to accommodate such frequency variations at each specific location in the flow duct. For instance, the plates can be flat, curved or angled with respect to both the liner surface plane and its normal. FIG. 2 shows linear plates 10A in plural parallel rows of alternating direction. FIG. 3 shows consecutive plates 10B having a slight wave-like shape. FIGS. 4-5 show consecutive plates 10C, 10D having a steeper wave-like shape. Obviously, many other shapes can be used without departing from the scope of the invention.

The plates can have variable thicknesses. FIGS. 4-5 depict variations of the thickness of plates 10C, 10D. The thickness of the plates similarly effects the attenuation of sound.

Figure 6:
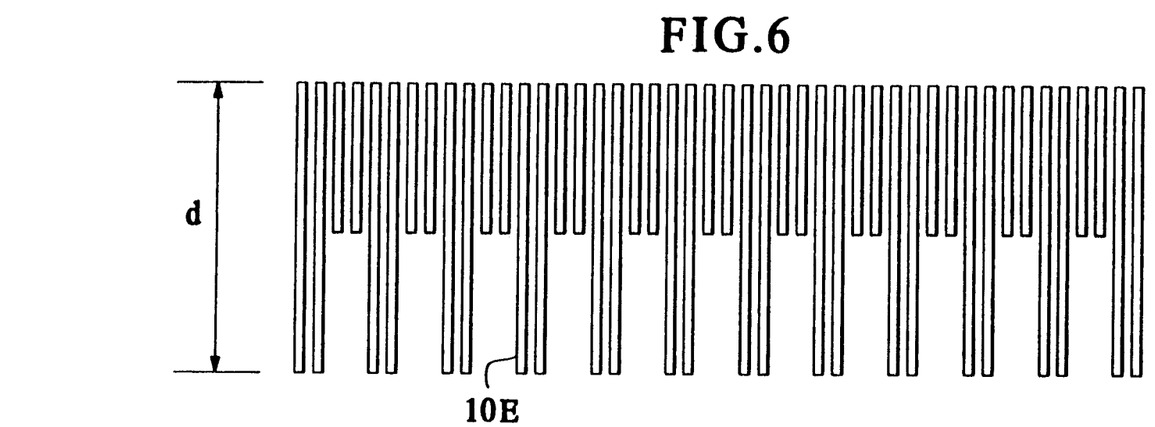
FIGS. 6 and 7 are side views showing two ways of varying the depth of a pattern of consecutive plates.
Figure 7:
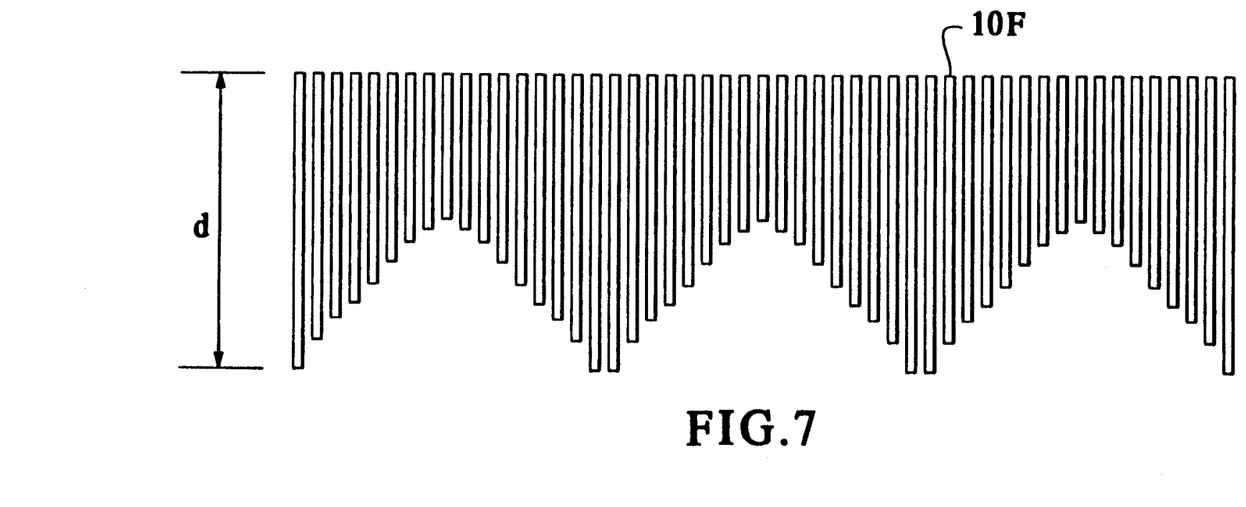
Figure 9:
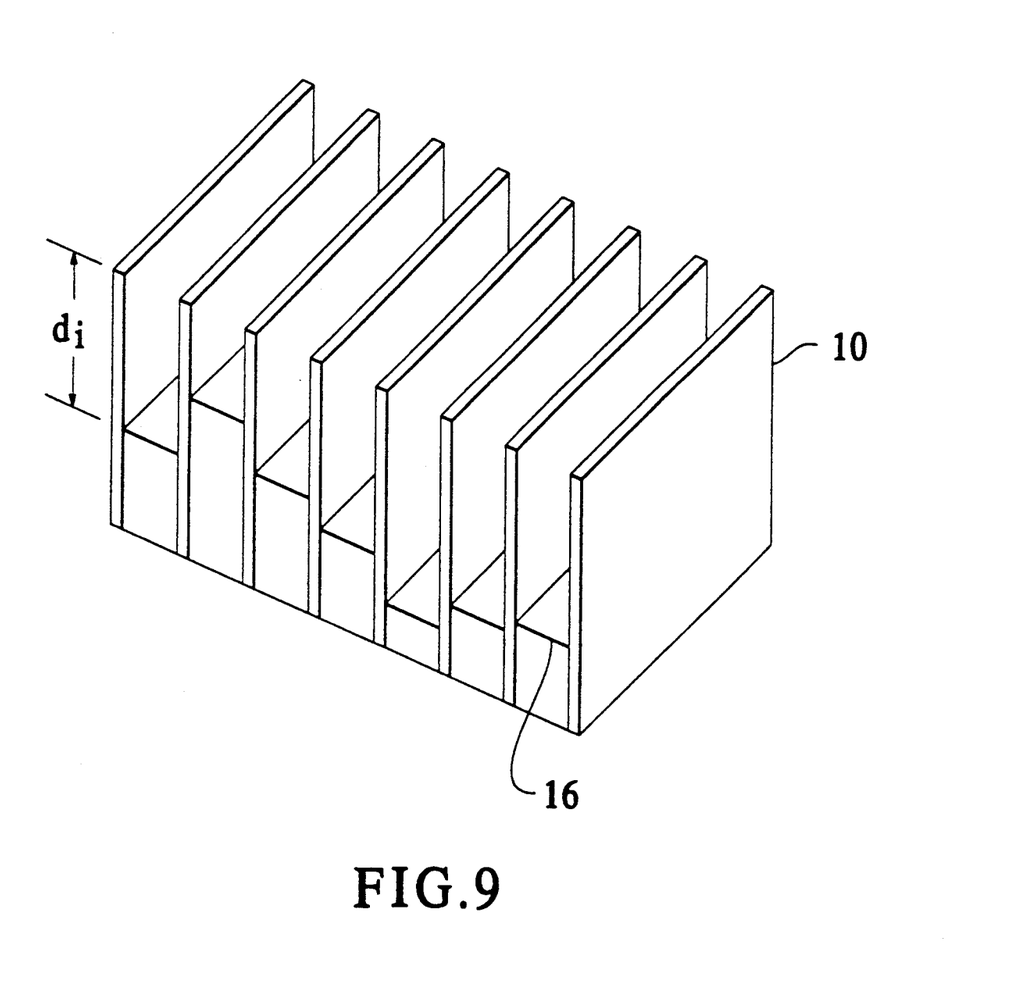
FIGS. 9 and 10 are perspective views of a liner having plates with varying depths.
Figure 10:
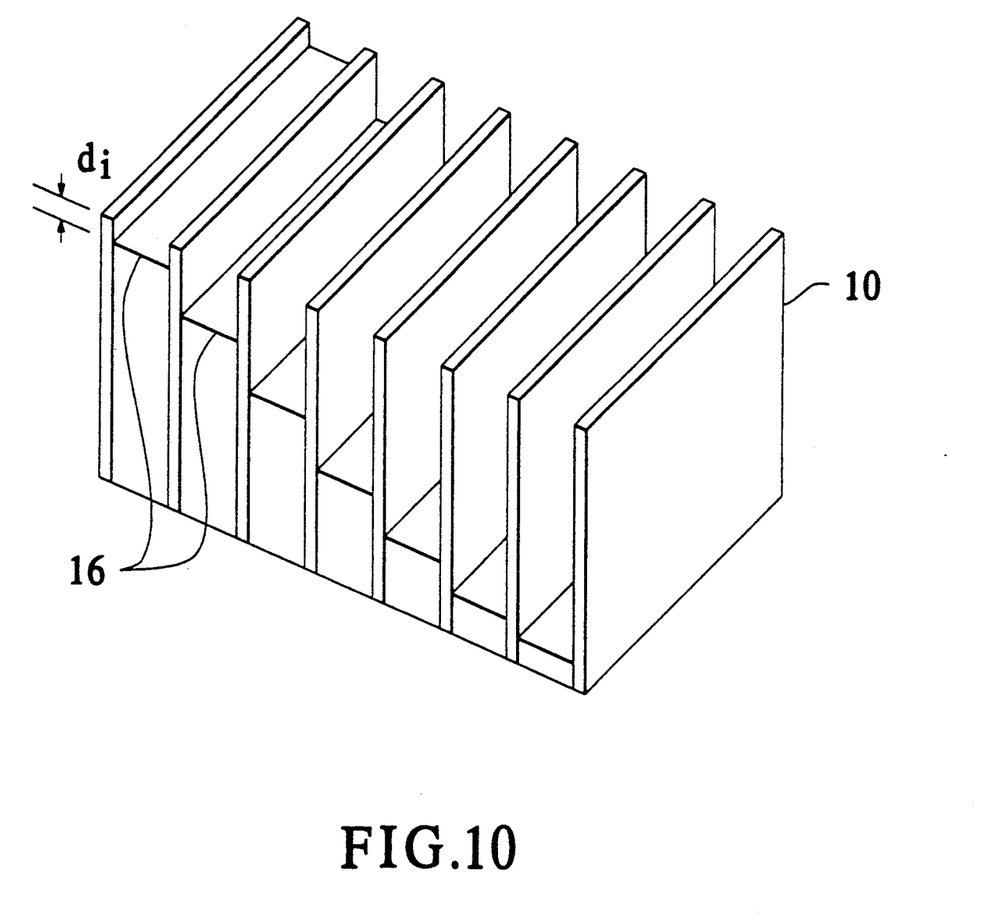

In addition, the plates can have varying depths, d. FIG. 6 depicts plates 10E having alternating depths, d. FIG. 7 depicts plates 10F having a depth, d, forming a sinusoidal shape. In FIGS. 6 and 7, the duct wall is defined at the upper portion of each FIGURE, where the edges of all plates are substantially in the same plane. FIG. 9 is a perspective view showing the plate structure with varying depths $d_i$ between plates (channel depths) being providing by placing, for example, a correspondingly shaped backing plate 16 between adjacent plates. FIG. 10 shows the channel depth, $d_i$, varying progressively in a step-like formation. The FIG. 10 embodiment shows how the cell depth might be comprised including a similar backing plate 16. The first (smallest) channel depth corresponds to ¼ of the wavelength of the highest frequency to be absorbed in that cell. The last (largest) channel depth corresponds to ¼ of the wavelength of the lowest frequency to be absorbed in that cell.

Varying the depth according to specific sound frequencies in the flow duct enables the plate structure to behave more like a bulk material. Thus, broadband attenuation can be achieved with simple geometrical adjustments such as by varying the plate spacing, thickness, depth, arrangement, etc. Such adjustments in the prior art devices are complex and expensive to carry out.

Figure 11:
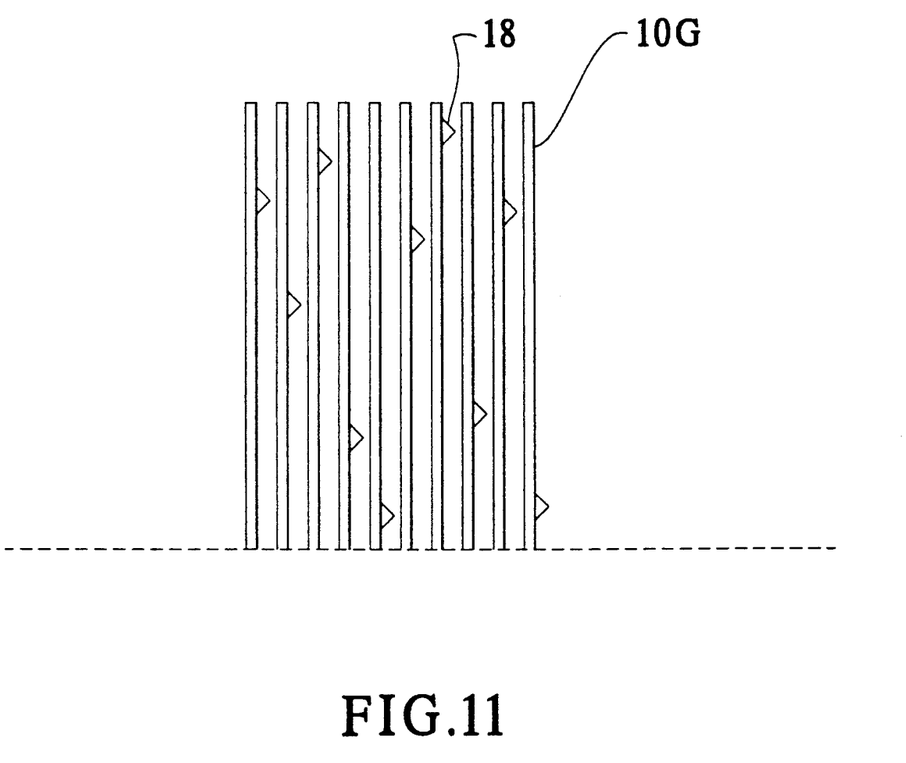
FIG. 11 is a side view showing the plates having ribs.

The plates can be smooth or can have surface texture such as ribs or other protuberances. FIG. 11 shows plates 10G having ribs 18.

The plates can be joined or integrally fabricated by any method suitable for the appropriate material, such that the specified geometry of the liner can be maintained during use. Examples of such joining methods include brazing, diffusion bonding, fasteners, etc. An example of an integral fabrication technique is chemical vapor infiltration of fiber-reinforced precursor materials.

As discussed above, variations in discrete sound frequencies within the duct can be accommodated by changing one or more of the plate geometries. Variations in the geometries control the impedance of the liner. For example, the spacings between plates (FIGS. 3 and 5), plate thicknesses (FIG. 4), plate depths (FIGS. 6 and 7), and also backing facesheet configurations can be varied throughout the duct so that the liner can be tuned to specific frequencies which would be characteristic of the application.

Two test specimens were constructed corresponding to the box like holder 12 of FIG. 1. The specimens slat1$h$, slat2$h$ had, respectively, 52 and 43 plates with surface-to-surface plate separations of 0.015 and 0.0235 inches, respectively. Plate thickness for both specimens was 0.025 inches, and the specimen depth, d, was 2.0 inches.

A bulk type acoustic absorber specimen cork 1 made of ceramic foam was produced as a comparison product. As discussed above, bulk absorbers have generally good acoustic absorption over a wide range of frequencies but are not acceptable for aircraft propulsion systems because of their mechanical inadequacies. However, bulk absorbers serve as baseline test materials for comparison with other potentially useful absorbers. Bulk absorbers tend to be nonresonant in their absorption, versus frequency behavior, and consequently have no well defined frequency at which peak absorption occurs (i.e., no tuning is required). This can be a very desirable characteristic when noise over a wide frequency range is to be attenuated.

Figure 8:
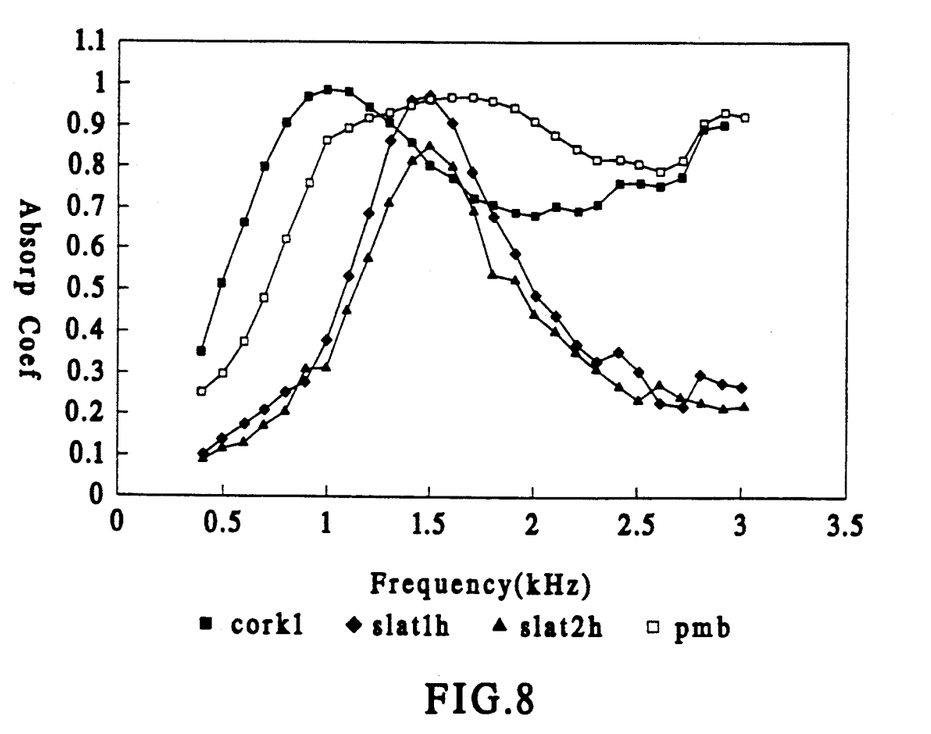
FIG. 8 is a graph showing comparisons of the present invention with prior art noise attenuators.

FIG. 8 shows a graph of the comparison of the acoustic absorption coefficient behavior with frequency of the two test specimens with those of the ceramic foam test specimen cork 1 and a variable depth (1.0 to 3.2 inches) ceramic honeycomb test specimen pmb. Although the consecutive plate structure does not have, in its constant depth form, the wide bandwidth of the bulk absorber, it achieves excellent attenuation at specific frequencies. Still further, it can be made to behave like a bulk material via a variable depth feature.

Figure 13:
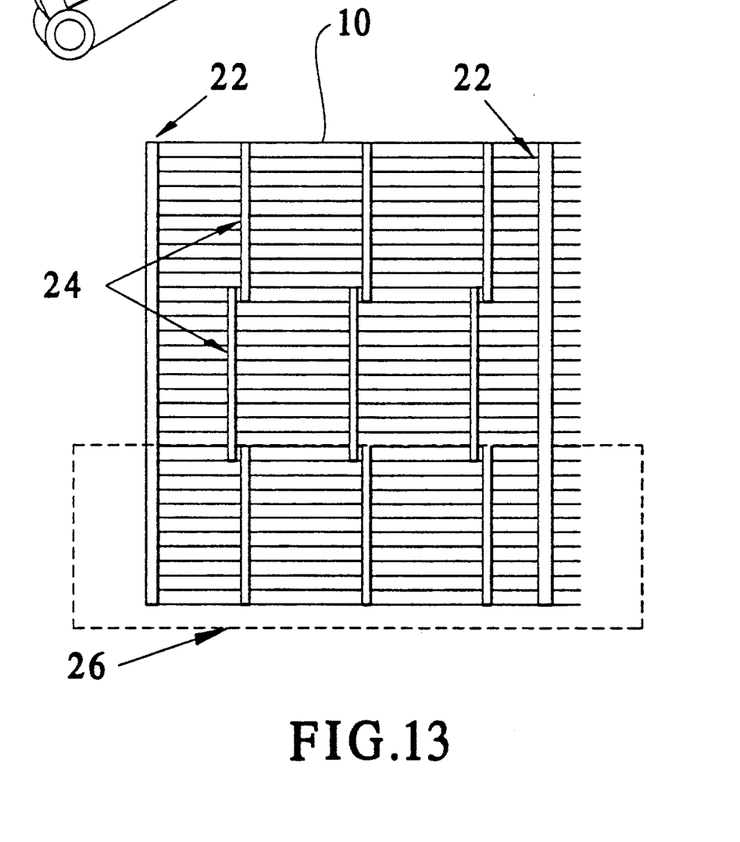
FIG. 13 is a view from below the plate structure of FIG. 12.

The invention will now be described for use with an exhaust nozzle flap 20. The description is for example purposes only, and the invention is not meant to be limited thereto. Referring to FIGS. 12 and 13, edges of the plates 10 define the duct wall of an exhaust nozzle flap 20. The plates are supported by primary supports 22 and secondary supports 24. Secondary supports 24 are arranged to configure a plate sub-assembly 26. A plurality of plate sub-assemblies can be adjoined to form the wall of the exhaust nozzle flap 20. Each sub-assembly may be adapted to accommodate frequency variations within the duct as discussed above. Primary supports 22 secure the plate sub-assemblies forming a continuous plate structure as shown, for example, in FIGS. 12 and 13. Primary supports 22 and secondary supports 24 are preferably made of similar high temperature materials as plates 10. Plates 10 can be attached to supports 24 by any suitable means according to the material.

Although the invention has been described in detail, it will be apparent to those skilled in the art that various modifications may be made without departing from the scope of the claims that follow.

What is claimed is:

1. An apparatus for attenuating sound in a flow duct, comprising:
a plurality of closely spaced plates disposed in said flow, said plates extending substantially perpendicular to a flow duct surface having a specific geometry, said plates having a predetermined depth and inter-plate spacing in the range between 0.005 and 0.025 inches.

2. An apparatus according to claim 1, wherein said geometry of said plates is selected based on variations in discrete sound frequencies generated in the flow duct thereby optimizing sound suppression over a broad frequency range throughout the flow duct.

3. An apparatus according to claim 1, wherein said plates are formed from a fiber reinforced composite material able to withstand high temperatures of at least 1300° C.

4. An apparatus according to claim 1, wherein said plates are formed from a ceramic matrix composite material.

5. An apparatus according to claim 1, wherein said plates have a ribbed surface.

6. An apparatus according to claim 1, wherein at least some of said plural plates have depths dissimilar from other plates.

7. An apparatus according to claim 6, wherein said dissimilar depths are arranged to form a sinusoidal shape.

8. An apparatus according to claim 1, wherein depths of said channels between at least some of said plates are dissimilar from depths of channels between other plates.

9. An apparatus according to claim 8, wherein said dissimilar channel depths are arranged in a step-like progression.

10. An apparatus according to claim 1, wherein said plates are flat.

11. An apparatus according to claim 1, wherein said plates are curved.

12. An apparatus according to claim 1, wherein said plates are arranged in plural parallel rows of alternating direction.

13. An apparatus according to claim 1, further comprising means for securing said plates relative to each other such that said geometry is maintained during use.

14. An apparatus for attenuating sound in a flow duct comprising:
   a plurality of plate sub-assemblies joined to form a duct wall, each of said plates sub-assemblies comprising a plurality of closely spaced plates extending substantially perpendicular to said duct wall and having a specific geometry, said plates having a predetermined depth and inter-plate spacing between about 0.005 inches and about 0.025 inches so that spaces between said plates act as narrow channels for acoustic dissipation associated with sound propagation without substantially reducing the rate of flow through the flow duct.

15. An apparatus according to claim 14, wherein said geometry of said plates is selected based on variations in discrete sound frequencies generated in the flow duct, each of said plate sub-assemblies being adapted to accommodate a particular frequency range in the flow duct thereby optimizing sound suppression over a broad frequency range throughout the flow duct.

16. A method of attenuating sound in a flow duct, comprising the steps of:
   arranging a plurality of closely spaced plates having a predetermined geometry within a flow duct to extend substantially perpendicular to a flow duct surface, said plates having a predetermined depth and inter-plate spacing in the range between about 0.005 inches and about 0.025 inches.

17. A method according to claim 16, further comprising the step of selecting said specific geometry to accommodate variations in discrete sound frequencies present within said duct, thereby optimizing sound suppression over a broad range throughout said duct.

18. A method according to claim 16, further comprising the step of determining discrete sound frequencies throughout the flow duct prior to arranging said plates in said flow duct, and arranging said plates in accordance with said frequencies.

19. A method according to claim 17, wherein said sound frequency variations are accommodated by selecting plates having a variety of depths.

20. A method according to claim 17, wherein said sound frequency variations are accommodated by selecting said inter-plate spacing.

21. A method according to claim 17, wherein said sound frequency variations are accommodated by selecting a curvature of said plates.

22. A method according to claim 17, wherein said sound frequency variations are accommodated by selecting a depth of said channels.

23. A method of attenuating sound in a flow duct, comprising the steps of:
   adjoining a plurality of plate sub-assemblies thereby forming a duct wall, each of said plate sub-assemblies being formed by arranging a plurality of closely spaced plates having a predetermined geometry within a flow duct to extend substantially perpendicular to said duct wall, said plates having a predetermined depth and inter-plate spacing in the range between about 0.005 inches and 0.025 inches so that spaces between said plates act as narrow channels for acoustic discipline associated with sound propagation without substantially reducing the rate of flow through said flow duct.

24. A method according to claim 23, further comprising the step of selecting said specific geometry to accommodate variations in discrete sound frequencies present within said flow duct, thereby optimizing sound suppression over a broad frequency range throughout said flow duct.

25. A method according to claim 23, further comprising the step of determining discrete sound frequencies throughout the flow duct prior to adjoining said plate sub-assemblies, and selecting said plate sub-assemblies in accordance with said frequencies.

* * * * *